(12) United States Patent
Rastegar

(10) Patent No.: US 10,062,910 B2
(45) Date of Patent: Aug. 28, 2018

(54) RESERVE POWER SOURCE FOR MUNITIONS

(75) Inventor: Jahangir S. Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 428 days.

(21) Appl. No.: 13/117,109

(22) Filed: May 26, 2011

(65) Prior Publication Data

US 2012/0135276 A1 May 31, 2012

Related U.S. Application Data

(60) Provisional application No. 61/349,184, filed on May 27, 2010.

(51) Int. Cl.
*H01M 6/20* (2006.01)
*H01M 6/36* (2006.01)
*H01M 16/00* (2006.01)

(52) U.S. Cl.
CPC ............... *H01M 6/20* (2013.01); *H01M 6/36* (2013.01); *H01M 16/00* (2013.01)

(58) Field of Classification Search
CPC .... H01M 6/36; H01M 16/00; H01M 2220/20; H01M 6/20
USPC ................ 429/121, 112, 115; 102/207, 218; 320/127, 166
See application file for complete search history.

(56) References Cited

U.S. PATENT DOCUMENTS

| 4,372,211 A * | 2/1983 | Dante ........................... 102/207 |
| 2003/0044665 A1* | 3/2003 | Rastegar et al. ................ 429/27 |
| 2008/0018264 A1* | 1/2008 | Teneze .......................... 315/291 |
| 2009/0013891 A1* | 1/2009 | Rastegar et al. .............. 102/210 |

* cited by examiner

*Primary Examiner* — Rena Dye Cronin

(57) ABSTRACT

A method for producing electrical energy in a munition includes; initiating a thermal battery contained within the munition to generate electrical energy; dumping the electrical energy generated by the thermal battery into an electrical energy storage device before the thermal battery becomes inactive; and using the stored electrical energy in the electrical energy storage device over a period of time. The initiation device can be an inertial igniter, the electrical energy storage device can be a capacitor and the thermal battery, initiation device and electrical energy storage device can be configured such that the initiation device and electrical energy storage device sandwich the thermal battery.

4 Claims, 1 Drawing Sheet

RESERVE POWER SOURCE FOR MUNITIONS

CROSS-REFERENCE TO RELATED APPLICATION

This application claims the benefit of U.S. Provisional Application No. 61/349,184 filed on May 27, 2011, the contents of which is incorporated herein by reference.

BACKGROUND

1. Field

The present invention relates generally to reserve power sources for munitions; and more particularly to compact and integrated thermal battery and storage devices such as capacitors for use in gun-fired munitions, sub-munitions, mortars and the like.

2. Prior Art

Thermal batteries represent a class of reserve batteries that operate at high temperatures. Unlike liquid reserve batteries, in thermal batteries the electrolyte is already in the cells and therefore does not require a distribution mechanism such as spinning. The electrolyte is dry, solid and non-conductive, thereby leaving the battery in a non-operational and inert condition. These batteries incorporate pyrotechnic heat sources to melt the electrolyte just prior to use in order to make them electrically conductive and thereby making the battery active. The most common internal pyrotechnic is a blend of Fe and $KClO_4$. Thermal batteries utilize a molten salt to serve as the electrolyte upon activation. The electrolytes are usually mixtures of alkali-halide salts and are used with the $Li(Si)/FeS_2$ or $Li(Si)/CoS_2$ couples. Some batteries also employ anodes of Li(Al) in place of the Li(Si) anodes. Insulation and internal heat sinks are used to maintain the electrolyte in its molten and conductive condition during the time of use. Reserve batteries are inactive and inert when manufactured and become active and begin to produce power only when they are activated.

Thermal batteries have long been used in munitions and other similar applications to provide a relatively large amount of power during a relatively short period of time, mainly during the munitions flight. Thermal batteries have high power density and can provide a large amount of power as long as the electrolyte of the thermal battery stays liquid, thereby conductive. The process of manufacturing thermal batteries is highly labor intensive and requires relatively expensive facilities. Fabrication usually involves costly batch processes, including pressing electrodes and electrolytes into rigid wafers, and assembling batteries by hand. The batteries are encased in a hermetically-sealed metal container that is usually cylindrical in shape. Thermal batteries, however, have the advantage of very long shelf life of up to 20 years that is required for munitions applications.

Thermal batteries generally use some type of igniter to provide a controlled pyrotechnic reaction to produce output gas, flame or hot particles to ignite the heating elements of the thermal battery. Currently, the following two distinct classes of igniters are available for use in thermal batteries.

The first class of igniters operates based on externally provided electrical energy. Such externally powered electrical igniters, however, require an onboard source of electrical energy, such as a battery or other electrical power source with related shelf life and/or complexity and volume requirements to operate and initiate the thermal battery. Currently available electric igniters for thermal batteries require external power source and decision circuitry to identify the launch condition and initiate the pyrotechnic materials, for example by sending an electrical pulse to generate heat in a resistive wire. The electric igniters are generally smaller than the existing inertial igniters, but they require some external power source and decision making circuitry for their operation, which limits their application to larger munitions and those with multiple power sources.

The second class of igniters, commonly called "inertial igniters," operate based on the firing acceleration. The inertial igniters do not require onboard batteries for their operation and are thereby used often in high-G munitions applications such as in non-spinning gun-fired munitions and mortars. This class of inertial igniters is designed to utilize certain mechanical means to initiate the ignition. Such mechanical means include, for example, the impact pins to initiate a percussion primer or impact or rubbing acting between one or two part pyrotechnic materials. Such mechanical means have been used and are commercially available and other miniaturized versions of them are being developed for thermal battery ignition and the like.

In general, both electrical and inertial igniters, particularly those that are designed to operate at relatively low impact levels, have to be provided with the means for distinguishing events such as accidental drops or explosions in their vicinity from the firing acceleration levels above which they are designed to be activated. This means that safety in terms of prevention of accidental ignition is one of the main concerns in all igniters.

In recent years, new and improved chemistries and manufacturing processes have been developed that promise the development of lower cost and higher performance thermal batteries that could be produced in various shapes and sizes, including their smaller versions. However, since thermal batteries rely on the high temperature to keep the electrolyte in the molten state following initiation, they require a considerable volume of insulation material to prevent the battery from cooling too fast and solidify the electrolyte, thereby very quickly rendering the battery inactive. The need for a considerable amount of insulation around the hot chemicals is a factor that significantly limits the minimum size of thermal batteries, particularly if the thermal battery is required to stay active for relatively long periods of time. These limitations have prevented the development of very small thermal batteries for use in medium and small caliber munitions and sub-munitions, particularly since these munitions spin at very high rates and that in general very high rates are detrimental to the operation of thermal batteries due to the movement of the electrolyte caused by high centrifugal forces.

SUMMARY

A need therefore exists for reserve power sources for gun-fired munitions, mortars and the like that are inactive prior to launch and become active during or after certain amount of time following launch or other similar acceleration or deceleration event.

In particular, there is a need for small reserve power sources for small and medium caliber munitions that can withstand very high firing accelerations; have very long shelf life, such as beyond 20 years; that can be used in munitions with any spin rate, including very low or no spin to very high spin rate munitions; and that they do not require external power sources to initiate them.

Such reserve power sources are preferably initiated as a result of the round firing using inertial igniters such as those disclosed in U.S. Pat. Nos. 7,587,979 and 7,437,995 or piezoelectric-based inertial igniters such as those disclosed in U.S. Patent Application Publication No. 2008/0129251, each of which are incorporated herein by reference. The inertial igniters, particularly those that can provide relatively long initiation delay, are highly advantageous since by delaying the initiation, the time period in which the molten electrolyte of the thermal battery is subjected to high acceleration/deceleration levels is reduced or even preferably eliminated. The initiation devices to be used must also be capable to operate safely by differentiating all-fire and various no-fire events such as accidental drops and vibration and impact during transportation and loading and even nearby explosions. The task of differentiating all-fire conditions from no-fire conditions is preferably performed without the use of external acceleration sensors and the like, and/or the use of external power sources.

An objective of the present invention is to provide a new type of reserve power source that can be fabricated in small sizes suitable for use in small and medium caliber munitions, sub-munitions and the like. The reserve power sources will use the basic thermal battery or other similar reserve battery technology to generate electrical energy upon activation. The electrical energy is then stored in electrical energy storage devices such as capacitors. The disclosed embodiments allow the fabrication of significantly smaller reserve power sources than currently available thermal batteries.

To ensure safety and reliability, the reserve power source initiator must not initiate during acceleration events which may occur during manufacture, assembly, handling, transport, accidental drops, etc. Additionally, once under the influence of an acceleration profile particular to the firing of the ordinance, i.e., an all-fire condition, the initiator must initiate with high reliability. In many applications, these two requirements compete with respect to acceleration magnitude, but differ greatly in their duration. For example:

An accidental drop may well cause very high acceleration levels—even in some cases higher than the firing of a round from a gun. However, the duration of this accidental acceleration will be short, thereby subjecting the initiator to significantly lower resulting impulse levels.

It is also conceivable that the initiator will experience incidental long-duration acceleration and deceleration cycles, whether accidental or as part of normal handling or vibration during transportation, during which it must be guarded against initiation. Again, the impulse input to the igniter will have a great disparity with that given by the initiation acceleration profile because the magnitude of the incidental long-duration acceleration will be quite low.

The disclosed reserve power sources are preferably provided with hermetically sealed packaging. The disclosed reserve power sources would therefore be capable of readily satisfying most munitions requirement of 20-year shelf life requirement and operation over the military temperature range of −65 to 165 degrees F., while withstanding high G firing accelerations.

Some of the features of the disclosed "reserve power sources" for gun-fired projectiles, mortars, sub-munitions, small rockets and the like include:

1. The disclosed reserve power sources can be fabricated using existing technologies, thereby making them highly cost effective, reliable and very small in size and volume.
2. The disclosed reserve power sources do not require any external power sources for their activation.
3. The novel design of the disclosed reserve power sources allow the packaging of the power sources to withstand very high-G firing accelerations in excess of 50,000 Gs.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION

Figure 2:
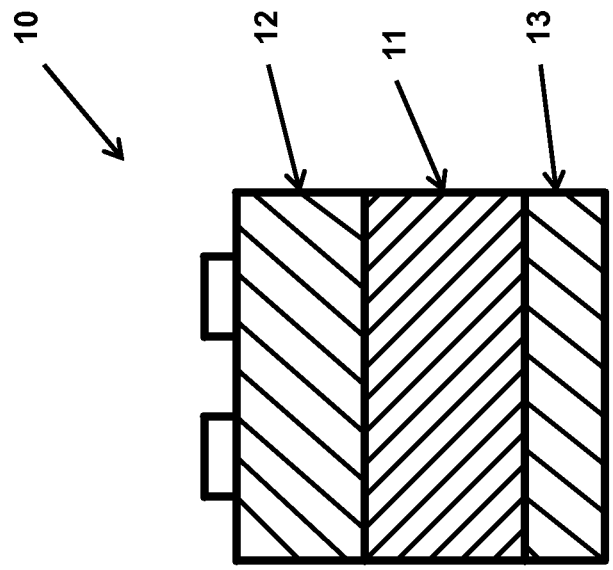
FIG. 2 illustrates a sectional view of the reserve power source of FIG. 1.

In thermal batteries, the electrolyte is solid until it is melted as its temperature is raised as a result of the ignition of the pyrotechnics materials inside the thermal battery or due to other externally provided heat sources, thereby activating the thermal battery. Following activation, a thermal battery stays activated essentially only as long as its electrolyte is in its molten state. For this reason, to keep thermal batteries long enough to provide power over the required length of time, thermal batteries are provided with enough thermal insulation to keep them active during the required period of time, for the case of gun-fired munitions for a few seconds to tens of seconds and even a few minutes. The required layer(s) of insulation material around the thermal battery (chemical) core limits the size (volume) of the thermal battery even when the thermal battery is required to produce minimal electrical energy, for example in the order of a few Joules (J) and even a few hundred milli-Joules (mJ).

In the particular case of gun-fired munitions, sub-munitions and mortars, in particular for their fuzing applications, only a few mJ or at most J of electrical energy is required to be provided by the power source. This power, however, is required to be provided over relatively long periods of time, in some cases a few minutes and usually at least tens of seconds. In applications such as sub-munitions, the electrical power may have to be provided for several minutes to provide for self-destruct and/or disarming capabilities to minimize the probability that sub-munitions become unexploded ordinance (UXO). For the above reasons, thermal batteries must be provided with enough thermal insulation and must be constructed with enough volume that would allow the introduction of enough thermal energy to allow the thermal battery to stay active over the required length of time.

The new method being disclosed provides the means to construct reserve power sources that are based on thermal battery chemistry or the like and its combination with appropriate electrical energy storage devices such as capacitors as an integrated reserve power source. In this method, the thermal battery portion of the reserve power source generates electrical energy upon activation, preferably via an inertial igniter, and the generated electrical energy is rapidly transferred to the electrical energy storage device, preferably a low leakage capacitor. In reserve power sources designed using this method, the thermal battery component of the power source does not require a significant thermal insulation and in many applications may not require any insulation since the generated electrical energy may be transferred to the electrical energy storage device before the molten electrolyte has the time to cool to its solid state. This is generally possible since the cooling (thermal) time constant is generally much longer than those of properly sized electrical storage devices such as capacitors. As a result, by eliminating or at least minimizing the need for thermal insulation, the resulting reserve power source can be constructed in very small volumes, and making them also suitable for application in small and medium caliber munitions and sub-munitions. In addition, since the electrical energy is discharged from the thermal battery chemistry component of the reserve power source very rapidly, very high firing accelerations and spin rate would not have enough time to adversely affect the operation of the thermal battery component of the reserve power source before the desired amount of electrical energy is transferred to the electrical storage device. In addition, the initiation and electrical energy storage components of the reserve power source may be used to provide certain amount of thermal insulation to the hot thermal battery component of the reserve power source.

Figure 1:
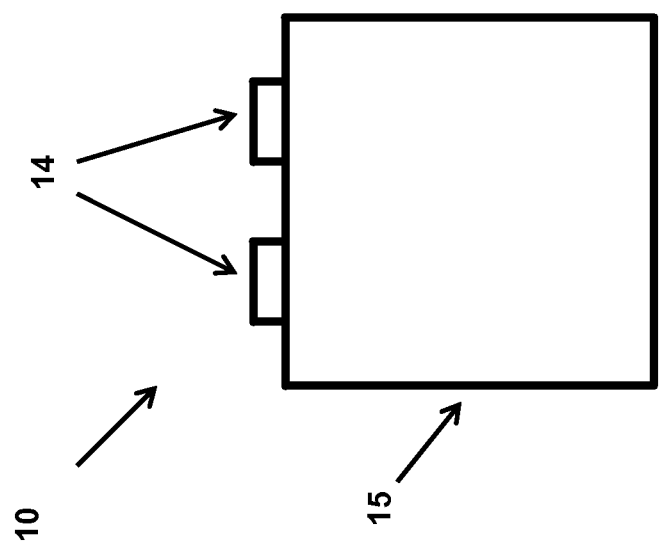
FIG. 1 illustrates a schematic view of a reserve power source.

The schematic of the a reserve power source embodiment 10 is shown in FIG. 1. As can be seen in FIG. 1, the reserve power source consists of a body 15 and terminals 14. In general, the reserve power source body 15 may have any convenient shape, preferably to match the available space in the munitions.

As shown in the cross-sectional view of FIG. 2, the reserve power source 10 is constructed as an integration of three main components; the thermal battery (chemistry) component 11, the electrical energy storage component 12 (such as at least one capacitor), and the initiation component 13 (preferably inertia based). In addition to the above main components, the reserve power source will also have simple electronics circuits (not shown) for charging the electrical storage component 12. The reserve battery terminals 14, FIG. 1, may in general be located at any convenient location. In addition, the initiation component 13 may be located on the bottom (as shown in FIG. 2), on the top, or at any other convenient location, and can be adjacent to the thermal battery component 11 to minimize the distance that the initiation flame (spark) has to travel to ignite the thermal battery pyrotechnics.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A battery consisting of:
   a battery casing having a hermetically sealed interior and an exterior; and
   electrical terminals extending from the exterior of the battery casing;
   wherein the hermetically sealed interior of the battery casing contains:
      a thermal battery for generating electrical energy upon initiation;
      an initiation device for initiating the electrical energy; and
      an electrical energy storage device for storing electrical energy generated by the thermal battery before the thermal battery becomes inactive.

2. The battery of claim 1, wherein the initiation device is an inertial igniter.

3. The battery of claim 1, wherein the electrical energy storage device is a capacitor.

4. The battery of claim 1, wherein the thermal battery, initiation device and electrical energy storage device are configured such that the initiation device and electrical energy storage device sandwich the thermal battery.

* * * * *